Dec. 24, 1929.　　　　M. P. HOLMES　　　　1,740,694

TRACTION MECHANISM

Original Filed Oct. 8, 1921

Inventor:
Morris P. Holmes.
by
att'y.

Patented Dec. 24, 1929

1,740,694

UNITED STATES PATENT OFFICE

MORRIS P. HOLMES, OF CLAREMONT, NEW HAMPSHIRE, ASSIGNOR TO SULLIVAN MACHINERY COMPANY, A CORPORATION OF MASSACHUSETTS

TRACTION MECHANISM

Application filed October 8, 1921, Serial No. 506,495. Renewed October 8, 1929.

My invention relates to hoists, and more particularly to hoisting mechanisms of the portable type.

An object of my invention is to provide an improved hoist. Another object of my invention is to provide an improved double drum hoist. A further object of my invention is to provide an improved double drum hoist having a single motor operative to drive the drums of said hoist. A still further object of my invention is to provide an improved hoisting mechanism comprising a unidirectional motor which is disposed within the mechanism and which may be connected to the mechanism to drive the same in either of opposite directions. Other objects and advantages of my improved construction will be apparent in the following specification and appended claims.

In the accompanying drawings I have shown for purposes of illustration one form which my invention may assume in practice.

In these drawings,—

Figure 1:
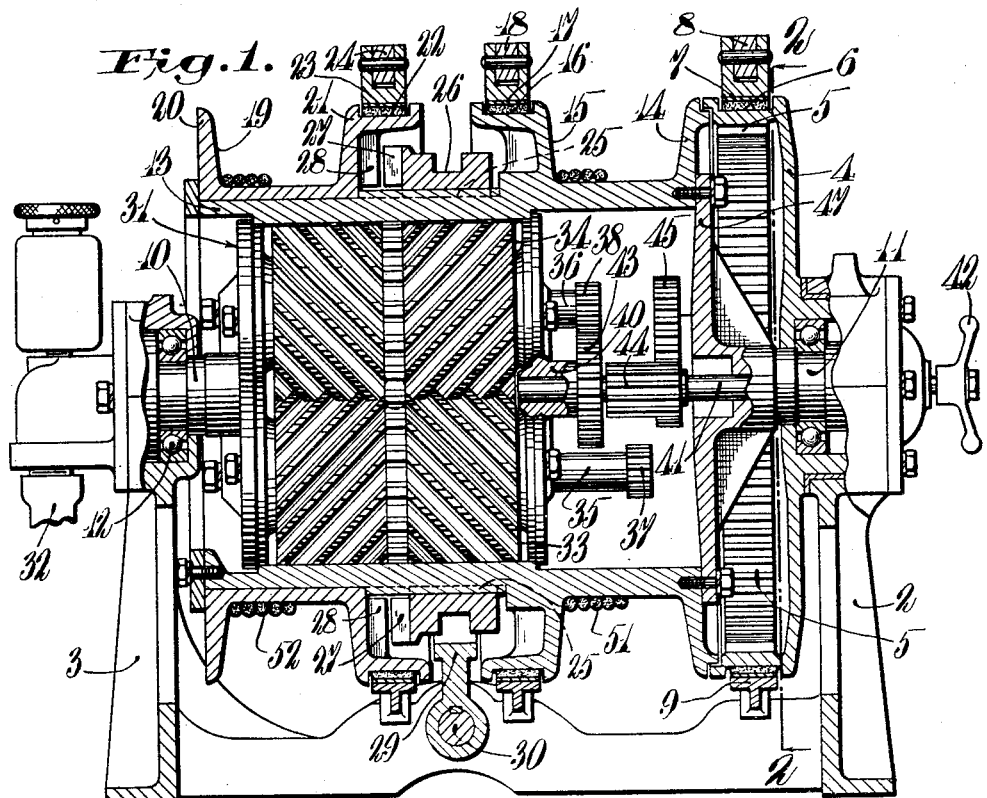
Fig. 1 is a view partially in elevation, but mainly in central vertical longitudinal section through the illustrative form of my improved hoisting mechanism.
Figure 2:
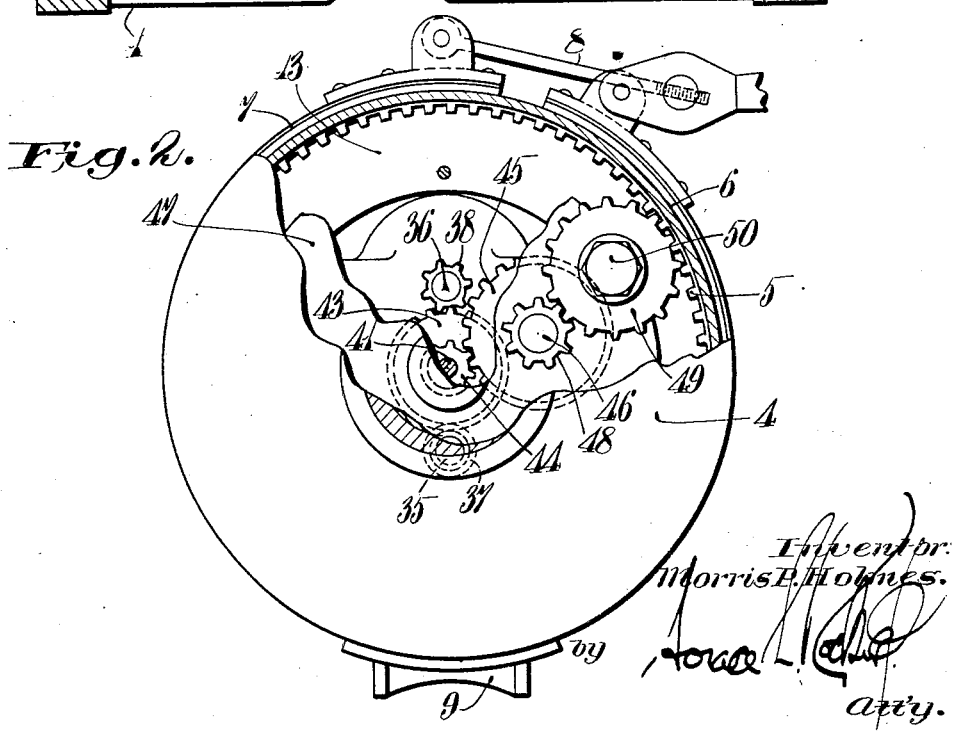
Fig. 2 is a view partially in elevation and partially in section on a plane corresponding to the line 2—2 of Fig. 1, parts being broken away to show the operating mechanism.

In the form of my invention which I have elected to show for purposes of illustration, I have provided a main frame of general U-shape designated 1 and comprising hangers 2 and 3. Within the right hand hanger 2 is rotatably mounted a member 4 comprising a large internal gear 5 provided about its periphery with a braking surface 6. A brake band 7, which is held against rotation by means indicated generally at 9, cooperates with the braking surface 6, and may, at the will of the operator be applied or released by a brake applying mechanism 8.

Within the hanger 3 and within the bearing for the member 4 are journaled shafts 10 and 11, these shafts being mounted in suitable ball bearings 12 and supporting a hollow drum member 13. The latter is formed upon its periphery adjacent one end thereof with a pair of upstanding flanges 14 and 15 forming a rope receiving space. The flange 15 is provided with a braking surface 16 with which a brake band 17, having operating means 18 similar to the mechanism designated 8 and shown in section, is designed to cooperate.

Rotatably mounted upon the periphery of the drum 13 is a second drum 19 disposed toward the end of the drum 13 remote from the flanges 14 and 15. This drum likewise has flanges, 20 and 21, of which the latter has a braking surface 22 with which a brake band 23 controlled by means 24 similar in construction to the means 8 may cooperate. Slidable longitudinally of the periphery of the drum 13, but held against relative rotation by a spline or splines 25, is a clutch collar 26 having clutch teeth 27 formed thereon which are adapted to engage with clutch teeth 28 carried on the drum 19. A shifting member 29 is adapted to rock about its shaft 30 to move the clutch collar 26 in such manner as to cause the teeth 27 to engage or disengage from the teeth 28. It will be understood that the brake bands 17 and 23 are provided with means similar to that shown at 9 to prevent rotation thereof.

Disposed within the hollow drum 13 is a fluid pressure motor 31 to which fluid is supplied from a fluid pressure connection 32. This motor comprises rotors 33 and 34 having intermeshing tooth blades forming expanding pockets upon rotation of the rotors and constructed and arranged substantially as described in Patent No. 1,520,242, granted Dec. 23, 1924. Each of these rotors 33 and 34 is provided with a projecting shaft, 35 and 36 respectively, these shafts being provided with pinions secured thereon and numbered 37 and 38. Intermediate the shafts 35 and 36 is a bearing 40 in which there is rotatable and also longitudinally slidable a shaft 41, which shaft is journaled coaxially within the shaft 11 and may be slid therein by means of a manual grasping member 42 disposed to the right hand end of the motor. Fixed upon the shaft 41 is a relatively large pinion 43 and a smaller pinion 44 which is of considerably greater length than the pinion 43. The pinion 44 meshes with the gear 45 which is secured to a shaft 46 extending through a head 47 of the drum 13 and carrying upon its outer end a pinion 48 which in turn meshes with a gear 49 which is rotatable upon a stub shaft 50 and meshes with the internal gear 5. Cables 51 and 52 are wound in opposite directions upon the portion of the drum 13 between the flanges 14 and 15 and upon the drum 19.

From the foregoing description the mode of operation of my invention will be readily apparent. Assume that air is supplied to the rotors 33 and 34 and that as a result, viewing the latter from the right hand end of Fig. 1, the shaft 36 will cause the pinion 38 likewise to rotate in a counterclockwise direction driving, with the parts in the position shown in Fig. 1, the gear 43 in a clockwise direction. As the gears 43 and 44 are fixed on the shaft 41. the gear 44 will also rotate clockwise and will cause the gear 45 to rotate counterclockwise. This will result in a counterclockwise rotation of the gear 48, a clockwise rotation of the gear 49, and, when the brake band 7 is caused to lock the member 4 against rotation, will result in a bodily rotation of the drum 13 in a counterclockwise direction. Therefore, assuming that the cable 51 is wound upon the drum 13 in a clockwise direction, the cable 51 will be wound in when the shaft 36 and pinion 38 are driving members. Now let it be assumed that it is desired to reverse the direction of rotation of the drum 13, it will be evident that this can be readily accomplished by simply pulling the shaft 41 toward the right in Fig. 1, in such manner that the pinions 38 and 43 will no longer mesh and so that the pinions 37 and 43 will mesh. It will be then evident that, since the shaft 35 rotates in an opposite direction to the shaft 36, under similar conditions of the brake band 7 the drum 13 will rotate clockwise when viewed from the right and accordingly that the cable 51 will be unwound.

Now remembering that the cable 52 is wound in an opposite direction to the cable 51, that is counterclockwise, it will be evident that if the clutch member 26 is moved to the left in Fig. 1, while the gears 37 and 43 are in mesh, the drum 19 will be driven in a clockwise direction and the cable 52 will be reeled in while the cable 51 is reeled out. It will therefore be evident that the free ends of the cables may be connected together and passed around a pulley at a distance from the hoisting mechanism, and that by reversing the direction of the rotation of the drum 13 and so also of the drum 19, it will be possible to move a member secured to either of the cables alternately toward and from the hoist. It will also be evident that if it is desired to let out more cable so that the pulley just mentioned can be moved away from the hoist, this can be accomplished by releasing the clutch teeth 27 and 28, by causing the cable 51 to reel in while the cable 52 unwinds by reason of the free rotation of the member 19 upon the drum 13 and by thereafter reversing the rotation of the drum 13 without engaging the teeth 27 and 28; then, when the requisite amount of cable is free, by reengaging the teeth 27 and 28, it will be possible to perform the previously described movement of any member toward and from the hoist with the aid of the stationary spaced pulley. Other features of the mode of operation of my improved hoisting mechanism will be readily apparent from those which have been described and will suggest themselves to one skilled in the art to which this invention relates.

While I have in this application specifically described one form which my invention may assume in practice, it will be understood that this form of the same is shown for purposes of illustration and that the invention may be modified and embodied in various other forms without departing from its spirit or the scope of the appended claims.

What I claim is new and desire to secure by Letters Patent is:

1. In a hoisting mechanism, a plurality of coaxially arranged relatively rotatable winding drums, a driving motor disposed within the drums, said motor having a casing supporting said drums and including a plurality of cooperating motor rotors, and means disposed within one drum whereby either of said rotors may constitute the element transmitting the drum rotating torque including a pinion carried by each of said rotors and a longitudinally movable gear engageable with said pinions alternatively, and means whereby said gear may be moved, said gear moving means being operable from the exterior of the drums.

2. In a hoisting mechanism, a plurality of coaxially arranged winding drums, a driving motor disposed within the drums, said driving motor including a plurality of cooperating motor rotors, and means disposed within one of the drums whereby either of said rotors may constitute the element transmitting the drum rotating torque including a pinion carried by each of said rotors and a longitudinally movable gear engageable with said pinions alternatively, said gear being disposed on a shaft arranged in alinement with the axis of rotation of the drums, and means disposed within one of the drums and extending axially of said drums to actuate said longitudinally movable gear, said latter means being operable from the exterior of said drums.

3. In a hoisting mechanism, a plurality of coaxially arranged relatively rotatable winding drums, a driving motor disposed within said drums, said driving motor including a plurality of cooperating motor rotors, and operative driving connections between said motor and drums including mechanism disposed within one drum whereby each of said rotors may selectively constitute the element transmitting drum rotating torque, and means disposed within the drums and operable from the exterior thereof for connecting said driving connections to said rotors alternatively.

4. In a hoisting mechanism, a rotatable drum, a unidirectional driving motor disposed within said drum, reversible driving connections selectively connectible with said motor in alternative relations for driving said drum in either of opposite directions, said drum having upon its exterior a rope winding portion and a portion constituting a bearing, and a second drum rotatable upon said bearing portion of said first mentioned drum.

5. In a hoisting mechanism, a rotatable drum, a unidirectional driving motor disposed within said drum, driving gearing adapted to be connected to said motor for rotating said drum, said gearing including gear changing means for reversing the direction in which said drum is rotated, said drum having upon its exterior a rope winding portion and a portion constituting a bearing, and a second drum rotatable upon said bearing portion.

6. In a hoisting mechanism, a rotatable drum, means disposed within said drum for driving the same in either of opposite directions including a unidirectional motor and reversible driving connections for driving said drum by said motor, a second drum rotatable relative to said first mentioned drum, means for clutching the drums together to rotate in unison, and a pair of haulage means, one secured to each drum.

7. In a hoisting mechanism, a rotatable drum, a unidirectional driving motor carried by said drum and rotatable at the same angular rate as said drum, and reversible driving connections selectively connectible with said motor in alternative relations for driving said drum in either of opposite directions including a reaction gear adapted to be held stationary and driving gearing cooperating therewith, said gearing including gear changing means for reversing the direction in which said drum is rotated.

8. In a hoisting mechanism, a rotatable drum, a motor disposed within said drum comprising a pair of motor elements rotating in opposite directions, and driving connections for selectively rotating said drum in either of opposite directions, said connections being connectible to one of said elements for driving the drum in one direction and connectible to the other for driving the drum in the opposite direction.

9. In a hoisting mechanism, the combination with a motor comprising a rotatable casing and a pair of intermeshing motor rotors therein, said casing carrying a rope winding drum for rotation therewith, of means for rotating said casing in either of opposite directions including a pair of driving pinions, one being driven by each motor rotor, a reaction gear, and gearing connectible to either of said pinions selectively, said gearing cooperating with said reaction gear for rotating said casing.

10. In a hoisting mechanism, a rotatable drum, a stationary gear, a motor disposed within said drum comprising a pair of motor elements rotating in opposite directions, and means driven by said motor and cooperating with said stationary gear for rotating said drum in either of opposite directions selectively including a pair of pinions, one being driven by each motor element, driving gearing within said drum, and means operable from the exterior of said drum for connecting said gearing to one or the other of said pinions selectively.

11. In a hoisting mechanism, a motor having a rotatable casing and comprising a pair of cooperating motor rotors rotatable in opposite directions, a rope winding drum carried by said casing for rotation therewith, a rope winding drum mounted on said casing for rotation relative thereto, means for clutching said second mentioned drum to said casing for rotation therewith, and driving connections for selectively rotating said casing in either of opposite directions, said connections being connectible to one of said rotors for driving the casing in one direction and connectible to the other of said rotors for driving the casing in the opposite direction.

12. A hoisting mechanism comprising a drum, a driving motor therefor disposed therein comprising a pair of intermeshing rotors whose axes of rotation sweep through surfaces of revolution during winding operation of said drum, the axes of said surfaces of revolution coinciding with the axis of the drum, a reaction member, operative driving connections cooperating with said reaction member and connectible to one of said rotors for driving said drum in one direction and connectible to the other of said rotors for driving said drum in the opposite direction, and means operable from the exterior of said drum for selectively controlling said driving connections.

13. In a hoisting mechanism, the combination with a plurality of coaxially arranged relatively rotatable winding drums, of means for rotating said drums disposed within the same including a driving motor comprising a casing supporting said drums and a plurality of cooperating motor rotors disposed within said casing, and means whereby either of said rotors may constitute the element transmitting the drum rotating torque including a pinion carried by each of said rotors, a longitudinally movable gear engageable with said pinions alternatively, and means for moving said gear, said gear moving means being operable from the exterior of the drums.

14. In a hoisting mechanism, the combination with a plurality of coaxially arranged winding drums, of driving means therefor disposed therein comprising a driving motor having a pair of cooperating motor rotors, and means whereby either of said rotors may constitute the element transmitting the drum rotating torque including a pinion carried by each of said rotors, a longitudinally movable gear engageable with said pinions alternatively, said gear being disposed on a shaft arranged in alinement with the axis of rotation of the drums, and means extending axially of said drums for actuating said longitudinally movable gear, said latter means being operable from the exterior of said drums.

15. In a hoisting mechanism, the combination with a plurality of coaxially arranged relatively rotatable winding drums, of means for rotating said drums disposed within the same including a driving motor comprising a plurality of cooperating motor rotors, mechanism whereby either of said rotors may selectively constitute the element transmitting drum rotating torque, and means operable from the exterior of said drums for connecting said mechanism to said rotors alternatively.

16. In a hoisting mechanism, a rotatable winding drum, and means for rotating said drum disposed within the same including a driving motor comprising a casing supporting said drum and a plurality of cooperating motor rotors disposed within said casing, and means whereby either of said rotors may constitute the element transmitting the drum rotating torque including pinions one carried by each of said rotors, a longitudinally movable gear engageable with said pinions alternatively, and means for moving said gear, said gear moving means being operable from the exterior of the drum.

17. In a hoisting mechanism, a rotatable winding drum, and means for driving said drum disposed within the same comprising a driving motor having a pair of cooperating motor rotors, and means whereby either of said rotors may constitute the element transmitting the drum rotating torque including pinions one carried by each of said rotors, a longitudinally movable gear engageable with said pinions alternatively, said gear being rotatable on the axis of rotation of the drum, and means operable from the exterior of said drum for moving said gear longitudinally of said axis in either direction selectively.

18. In a hoisting mechanism, a rotatable drum and means for rotating said drum disposed within the same including a driving motor comprising a plurality of cooperating motor rotors, mechanism whereby either of said rotors may selectively constitute the element transmitting drum rotating torque, and means operable from the exterior of said drum for connecting said mechanism to said rotors alternatively.

In testimony whereof I affix my signature.

MORRIS P. HOLMES.